United States Patent
Chu et al.

(10) Patent No.: US 9,582,481 B2
(45) Date of Patent: Feb. 28, 2017

(54) MECHANISM FOR PARTIAL DOCUMENT RESTORE

(71) Applicant: Apple Inc., Cupertino, CA (US)

(72) Inventors: Alan Chu, Santa Clara, CA (US); Wing Hei Law, Wanchai (HK)

(73) Assignee: APPLE INC., Cupertino, CA (US)

( * ) Notice: Subject to any disclaimer, the term of this patent is extended or adjusted under 35 U.S.C. 154(b) by 570 days.

(21) Appl. No.: 13/631,969

(22) Filed: Sep. 29, 2012

(65) Prior Publication Data

US 2014/0095973 A1   Apr. 3, 2014

(51) Int. Cl.
   *G06F 17/22* (2006.01)

(52) U.S. Cl.
   CPC ................ *G06F 17/2288* (2013.01)

(58) Field of Classification Search
   CPC ............ G06F 17/2288; G06F 17/3023; G06F 17/2247; G06F 8/71
   USPC ........................................................ 715/229
   See application file for complete search history.

(56) References Cited

U.S. PATENT DOCUMENTS

| | | | |
|---|---|---|---|
| 5,649,218 A | 7/1997 | Saito | |
| 6,658,626 B1* | 12/2003 | Aiken | G06F 17/2211 707/E17.039 |
| 7,856,424 B2 | 12/2010 | Cisler et al. | |
| 8,145,600 B1* | 3/2012 | Lewis et al. | 707/638 |
| 2008/0034013 A1* | 2/2008 | Cisler et al. | 707/203 |
| 2008/0172607 A1* | 7/2008 | Baer | 715/255 |
| 2008/0235579 A1* | 9/2008 | Champion et al. | 715/273 |
| 2010/0004944 A1* | 1/2010 | Palaniappan | 705/1 |
| 2010/0082553 A1 | 4/2010 | Beatty et al. | |
| 2010/0332479 A1 | 12/2010 | Prahlad et al. | |
| 2011/0022960 A1* | 1/2011 | Glover | 715/732 |
| 2012/0005156 A1* | 1/2012 | Grant et al. | 707/608 |
| 2012/0185762 A1* | 7/2012 | Ozer et al. | 715/229 |

OTHER PUBLICATIONS

Chien et al., Version Management of XML Documents, D. Suciu and G. Vossen (Eds.): WebDB 2000, LNCS 1997, Springer-Verlag Berllin Heidelberg, pp. 184-200 2001.

* cited by examiner

*Primary Examiner* — Stephen Hong
*Assistant Examiner* — Sanchita Roy
(74) *Attorney, Agent, or Firm* — Downey Brand LLP

(57) ABSTRACT

Method and apparatus for managing versions of a portion of a document on a computing system are described. Multiple versions of an object in the document are maintained on the computing system. A graphical representation of at least two versions of the object is displayed on a display to a user of the computing system. A previous version of the object is selected from the at least two versions of the object through an input device, and the object in the document is restored to the selected previous version. The object is a portion of the document less than the entirety of the document.

20 Claims, 13 Drawing Sheets

400

| Document Revision 1 302 | A 442 Recover | B 443 Revert | C 444 Revert | |
|---|---|---|---|---|
| Document Revision 2 304 | A 432 Recover | C 433 Revert | B 434 Revert | |
| Document Revision 3 306 | A 422 Recover | C 423 Revert | D 424 Revert | B 425 Revert |
| Document Revision 4 308 | C 412 Revert | D 413 Revert | B 414 Revert | |
| Document Revision 5 (Current) 310 | C 402 Current | D 403 Current | B 404 Current | |
| | E 405 Current | F 406 Current | G 407 Current | |

Figure 4

MECHANISM FOR PARTIAL DOCUMENT RESTORE

TECHNICAL FIELD

The described embodiments generally relate to methods and apparatuses for managing revision control for documents stored on a computing system. More particularly, the present embodiments describe reviewing multiple previous versions of a document and restoring selected portions of the document.

BACKGROUND

Managing multiple versions of a document in a single user or a multiple user environment is a desired feature that provides a coarse level of revision control. A user can retrieve an earlier version of a document in its entirety and restore the current version of the document to the previous version of the document. Structured documents can be stored with tagged objects including timestamps that can prove valuable in searching for previous versions of documents.

Frequently, a user can seek to retrieve only a portion of a document. Partial document restoration can provide an efficient method by which objects can be searched and retrieved to modify or add the previous version of an object to a current version of a document. Particularly, when multiple users modify an individual document, no single previous version can correspond to a version that a user can seek to restore the entire document. Rather only a portion of the document can be modified by the user (while another user can modify a separate portion of the document), and the user can seek to retrieve a version for only one portion of a document rather than the previous version of the document in its entirety. Network (cloud) based storage of documents have increased the ease of access to retrieve, edit and update documents by multiple users. Some applications can also allow simultaneous editing of documents by multiple users, and a method for partial document restoration can improve a user's experience by allowing editing on separate sections of documents without a requirement to "lock out" individual sections among users. Thus, there exists a need for a method to permit version control of documents with a graphical user interface to display and retrieve individual portions of a document that are less than a document in its entirety.

SUMMARY OF THE DESCRIBED EMBODIMENTS

In one embodiment, a method of managing versions of a portion of a document on a computing system is described. The method includes at least the following steps. In a first step, a computing system maintains multiple versions of an object in the document. A graphical representation of at least two versions of the object is displayed on a display. A selection of a previous version of the object selected from the at least two versions of the object displayed is received through an input device. The object in the document is restored to the selected previous version. The object is a portion of the document that is less than the entirety of the document. In an embodiment, the computing system is a remote server connected through the internet to a second computing system, and the display and the input device are connected to the second computing system.

In another embodiment, an apparatus for managing versions of a document is described. The apparatus includes at least a storage module, an output module, an input module and a processor. The storage module is configured to maintain multiple versions of an object in the document. The output module is configured to display a graphical representation of at least two versions of the object. The input module is configured to receive a selection of a previous version of the object selected from the at least two versions of the object. The processor is configured to restore the object in the document to the selected previous version. The object is a portion of the document less than the entirety of the document.

In a further embodiment, a computer program product encoded in a non-transitory computer readable medium for managing versions of a portion of a document on a computing system is described. The computer program product includes the following computer program code. Computer program code for maintaining multiple versions of an object in the document on the computing system. Computer program code for displaying a graphical representation of at least two versions of the object on a display. Computer program code for receiving a selection of a previous version of the object selected from the at least two versions of the object through an input device. Computer program code for restoring the object in the document to the selected previous version. The object is a portion of the document less than the entirety of the document.

BRIEF DESCRIPTION OF THE DRAWINGS

The described embodiments and the advantages thereof may best be understood by reference to the following description taken in conjunction with the accompanying drawings.

FIG. 4 is an exemplary representation of detailed thumbnails of multiple revisions of a document that can include a selection overlay.

DETAILED DESCRIPTION OF SELECTED EMBODIMENTS

Figure 1:
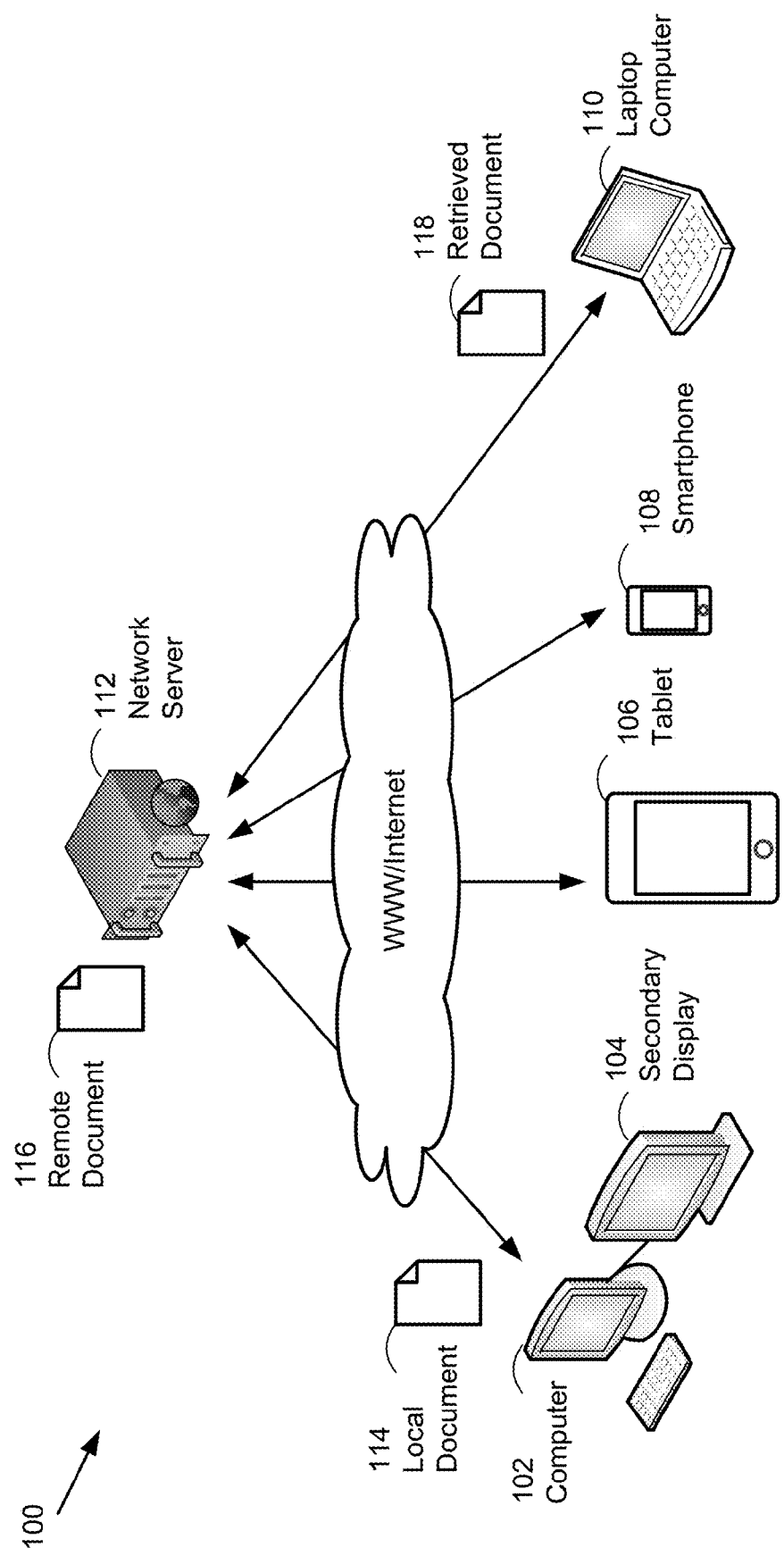
FIG. 1 illustrates a network of computing devices that can generate, process, exchange and display documents through an internet connection.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for managing versions of a portion of a page/document processed on a computing system and displayed to a user. (The terms "document" and "page" are used interchangeably in this patent application to indicate a file or portion thereof that can be generated, manipulated, retrieved and displayed by a computing device.) In some embodiments, the page/document and versions of the objects contained therein can be stored locally and displayed on a client device (i.e. a local computing system). In other embodiments, the page/document and versions of the objects contained therein can be stored and processed on a remote server and displayed on a computing device of a user connected to the remote server through a network, such as the internet (i.e. both a local computing system and a remote computing system). Objects in a document can include a page or a slide or an element on a page or slide, e.g. a paragraph, an image, a chart, a drawing and a text box. Objects can include formatting.

Partial document restoration allows a user to recover only a portion of a document, such as one or more objects in the document from previously stored versions of the document. The one or more objects can be added to a current version of the document or can replace objects in the current version of the document. A graphical representation of multiple previous versions of a document can be presented to a user on a display. The multiple previous versions of the document can be resident in local storage device or can be located across a network (including the internet) in a remote storage device. Thumbnails of the different previous versions of the document can be presented to the user with sufficient detail to indicate objects within the previous versions of the document. Detail can be presented hierarchically with the user able to drill down to finer levels of objects within a document. For example, the document can contain multiple pages, each page containing multiple objects. The user can replace or add one or more pages/slides from a previous version of the document to the current version of the document. The user can also replace or add one or more objects contained within pages/slides from the previous version of the document to the current version of the document, thus modifying only a portion of page/slide. Selection overlays on pages/slides presented to the user can indicate status for a version, e.g. current, modified and added. Overlays can also indicate possible restoration actions, e.g. recover and revert. Objects from previous versions of the document can be recovered when they are not present in the current version of the document and can be restored to an earlier version when a later version is present in the current version of the document.

Revision control systems usually allow a user to retrieve entire documents rather than view select portions of multiple previous versions of a document. Restoration in a revision control system typically requires restoring the entire document rather than only a portion thereof. When multiple people modify documents that are kept on a common shared storage device, a user can prefer to modify only a portion of the document, e.g. a set of slides the user is working on, while leaving the other slides unmodified. Partial document restore can provide a better mechanism for document modification in cloud (network storage) based solutions and offer finer control of a document when simultaneous collaborative editing by multiple users is enabled. Partial document restore can avoid having to lock sections of a document. A revision history of versions of the document including objects contained therein can be a "rubbish bin" of previously discarded versions that partial document restore can provide an efficient method for the user to search and retrieve content therefrom.

FIG. 1 illustrates a network 100 of computing devices that can generate, process, exchange and display documents through an internet connection. Representative computing devices include a computer 102, a tablet 106, a smartphone 108 and a laptop computer 110. Each of the computing devices illustrated can include an integrated and/or connected display on which documents can be reproduced. One of the computing devices, e.g. the computer 102, can generate a local document 114 that can be processed on the computer 102 and can be displayed on an integrated display of the computer 102 and also on a connected secondary display 104.

Local document 114 can be uploaded from computer 102 to network server 112 and downloaded from network server 112 to another computing device across a (World Wide Web) internet connection. At network server 112, stored remote document 116 can correspond exactly to source document 114 or can be a variant of source document 114 that includes changes that can be applied by users that retrieve and modify remote document 116 through an internet application. For example, a user of the computer 102 can initially create source document 114, upload source (local) document 114 to network server 112 and then manipulate source document 114 at network server 112 through a "web based" application thereby creating a new remote document 116. In some embodiments, remote document 116 can be modified by multiple users simultaneously. Network server 112 can maintain multiple versions of remote document 116, so that previous versions of remote document 116 can be viewed and searched. A portion of a previous version of remote document 116 can be restored to a current version of remote document 116 by a user without affecting other portions of the current version of the remote document 116. Similarly, a history of versions of local document 114 can be resident on a storage device connected to the computer 102 and can be viewed and/or searched to restore a portion of local document 114 from a previous version to a current version of local document 114.

Figure 2:
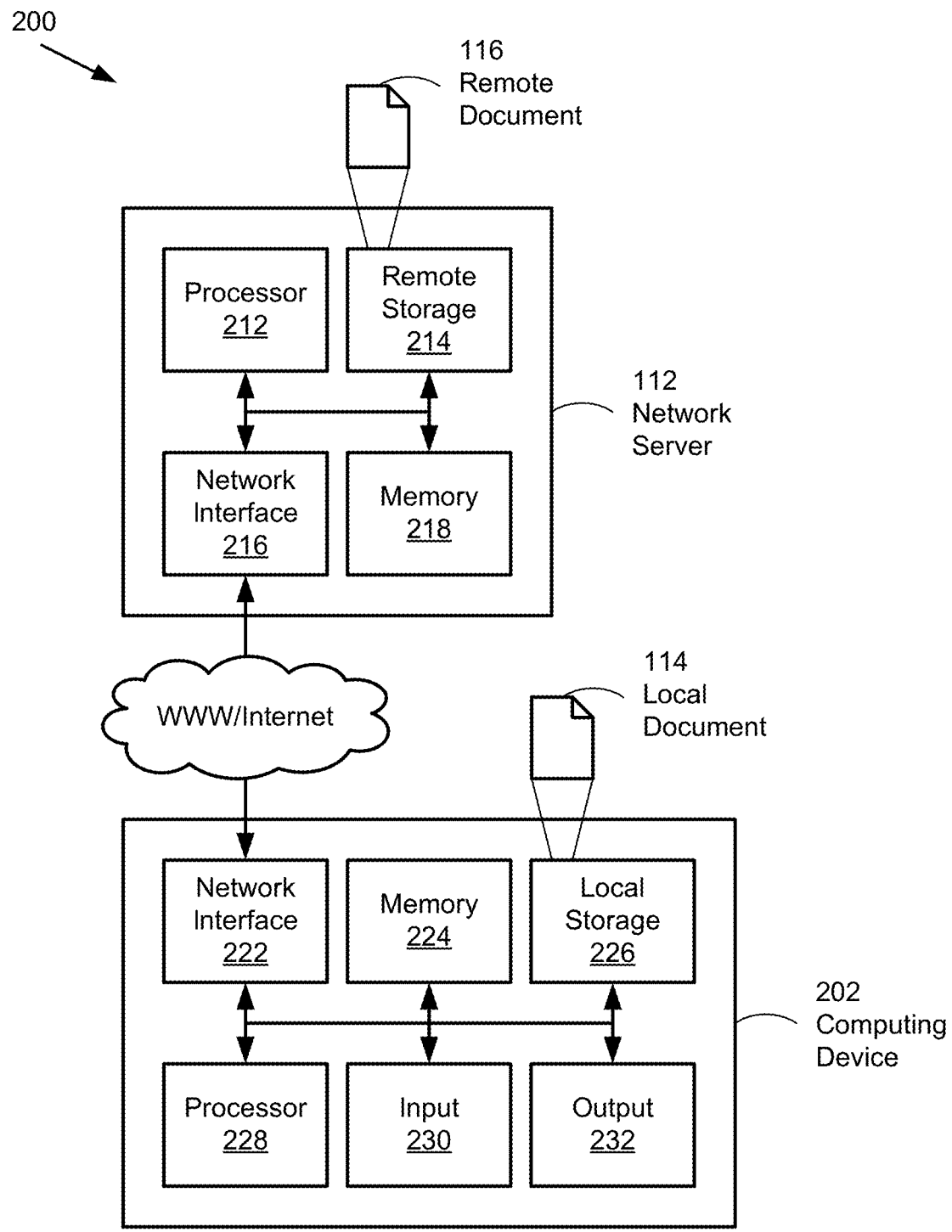
FIG. 2 illustrates elements of the network server and a computing device.

FIG. 2 illustrates elements of the network server 112 and computing device 202. Network server 112 can include processor 212, remote storage 214 and memory 218. Processor 212 can be a central processing unit that can include one or more processing cores. In other embodiments, processor 212 can be a microprocessor, embedded processor, processor emulator or the like. Memory 218 can be random access memory, read only memory, non-volatile memory or any other suitable memory technology. Processor 212 can be configured to read, write and execute program instructions stored in remote storage 214 or memory 218. Remote storage 214 can store programs and data, typically in amounts much greater than can be stored in memory 218. For example, remote storage 214 can consist of one or more hard disk drives, solid state drives or any other suitable storage element. Remote document 116 can be stored in remote storage 214 or memory 218.

Computing device 202 can include processor 228, local storage 226 and memory 224. Processor 228, local storage 226 and memory 224 can be configured similarly to processor 212, remote storage 214 and memory 218 as described above. Local document 114 can be stored in local storage 226. Additionally, computing device 202 can include input module 230 and output module 232. Input module 230 can be configured to accept user input to direct actions of computing device 202. Input module 230 can include a keyboard, pointing device (mouse), touch pad, touch screen or the like. Output module 232 can be configured to produce output for the user. For example, output module 232 can include a screen or projector capable of displaying one or more images.

Network server 112 can be coupled to computing device 202 through a network connection such as through an internet connection. In one embodiment, network server 112 can include network interface 216 and computing device 202 can include network interface 222. These network interfaces can each be configured to couple network server 112 and computing device 202 to a network, thereby coupling network server 112 to computing device 202.

A document, such as local document 114 can be created or edited on computing device 202. Local document 114 can then be stored in network server 112 as remote document 116. Other versions of remote document 116 can be stored in network server 112. In one embodiment, a version can include one or more independent documents that can be used to create or update a current version of a document.

Figure 3:
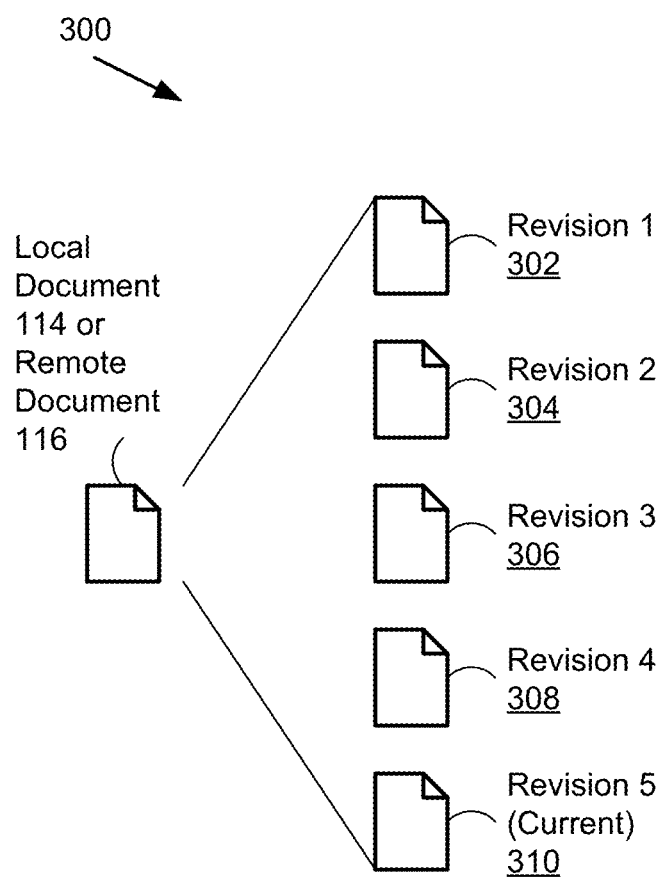
FIG. 3 illustrates multiple revisions of a local document or a remote document.

FIG. 3 illustrates multiple revisions 300 of a local document 114 or a remote document 116. Local document 114 or remote document 116 can be a text document, a word processing file, a graphic document, a drawing file, a web page or any other document that can include associated data. In one embodiment, the document (local document 114 or remote document 116) can include one or more objects. By way of example, a document can be a collection of slides that make up a visual presentation authored through a software program, or a document can be a collection of pages, or a collection of partial pages that can make up a word processing document.

As shown in FIG. 3, a document can include one or more revisions. Each revision can represent a discrete and independent version of the document. In the example of FIG. 3, local document 114 or remote document 116 can include five different revisions. Revision 5 (310) is the most recent revision, while revision 1 (302) can be the earliest revision. Subsequent revisions to revision 1 (302) are shown here as revision 2 (304), revision 3 (306) and revision 4 (308). In accordance with one embodiment of the specification, a revision (such a revision 5 (310)) can be a complete version of a document, however each document can include one or more objects.

FIG. 4 is an exemplary representation of detailed thumbnails 400 of multiple revisions of a document that can include a selection overlay. Thumbnails can be graphic representations of portions of a particular revision. Some thumbnails can include a portion of the document or object to visually cue the user as to the contents represented by the thumbnail. In this example, FIG. 4 shows in more detail the contents of each revision of a document of FIG. 3 (in particular, remote document 116). Each document revision can include one or more objects, and each object can be individually acted upon through recovery or by reverting to an earlier version.

Current revision of remote document 116 is revision 5 (310) and can include six objects: object C 402, object D 403, object B 404, object E 405, object F 406 and object G 407. In some embodiments, information related to ordering of the objects can be preserved with each revision. The selection overlay of objects 402-407, drawn in the lower portion of representative boxes 402-407, in revision 5 indicates "current" meaning that the object, as shown, is included in the current version stored on network server 112.

Revision 4 (308) of remote document 116 includes only three objects: object C 412, object D 413 and object B 414. Each object in Revision 4 (308) can be an earlier version of the corresponding object in Revision 5 (310). Thus object C 412 can be an earlier version of object C 402 and so forth. The selection overlay included with object C 412 shows "revert" meaning that the user can choose to revert from object C 402 to back to object C 412 in remote document 116. Notably, entire remote document 116 need not be reverted back to an earlier version, but rather one or more objects included in remote document 116 can be selected by the user for revision.

Revision 3 (306) can include four objects: object A 422, object C 423, object D 424 and object B 425. Any revision can also include one or more objects no longer included in the current revision, as illustrated with Revision 3 (306). Object A 422 is shown in revision 3 (306), but is not included in the subsequent revisions. Since object A 422 was removed from later revisions, the related selection overlay for object A 422 can be shown as "recover". That is, object A 422 can be recovered, in its entirety, and incorporated into the current version of the document.

Revision 2 (304) can include three objects: object A 432, object C 433 and object B 434. In a similar manner as described above, one or more of the objects 432-434 can be incorporated into a current revision of remote document 116. Again, since object A 432 was removed from the current version of the document, object A 432 can be recovered as indicated by its associated selection overlay. Similarly object C 433 or object B 434 can be incorporated into the current revision of the document by reverting to the version of the object in this version as shown by their associated selection overlay. Revision 1 (310) is the earliest version in this example. Revision 1 (310) includes three objects: object A 442, object B 443 and object C 444. Each object can include a selection overlay as described above.

In one embodiment, each version of each object in a revision can be independent of every other version. Returning to the example in FIG. 4, object A 422 can be independent of object A 432 in revision 2 (304) and object A 442 in revision 3 (302) can be independent of both object A 432 and object A 422. When choosing to create a new version or update a current version of a document, the user need not be limited to restoring the document to a particular revision, but rather can pick and choose which objects to include. For example, the user may desire to create a new version of the document that includes object A 422 from revision 3 (306) and object B 434 from revision 2 (304).

Although described from the point of view of network server 112, in some embodiments, a working document can be stored in network server 112, computing device 202 or a mixture of both. For example, a document can have one or more objects stored in network server 112 and one or more objects stored in computing device 202. Objects can be any portion of a document, such as a slide from a visual presentation or a page from a word processing document.

Figure 5:
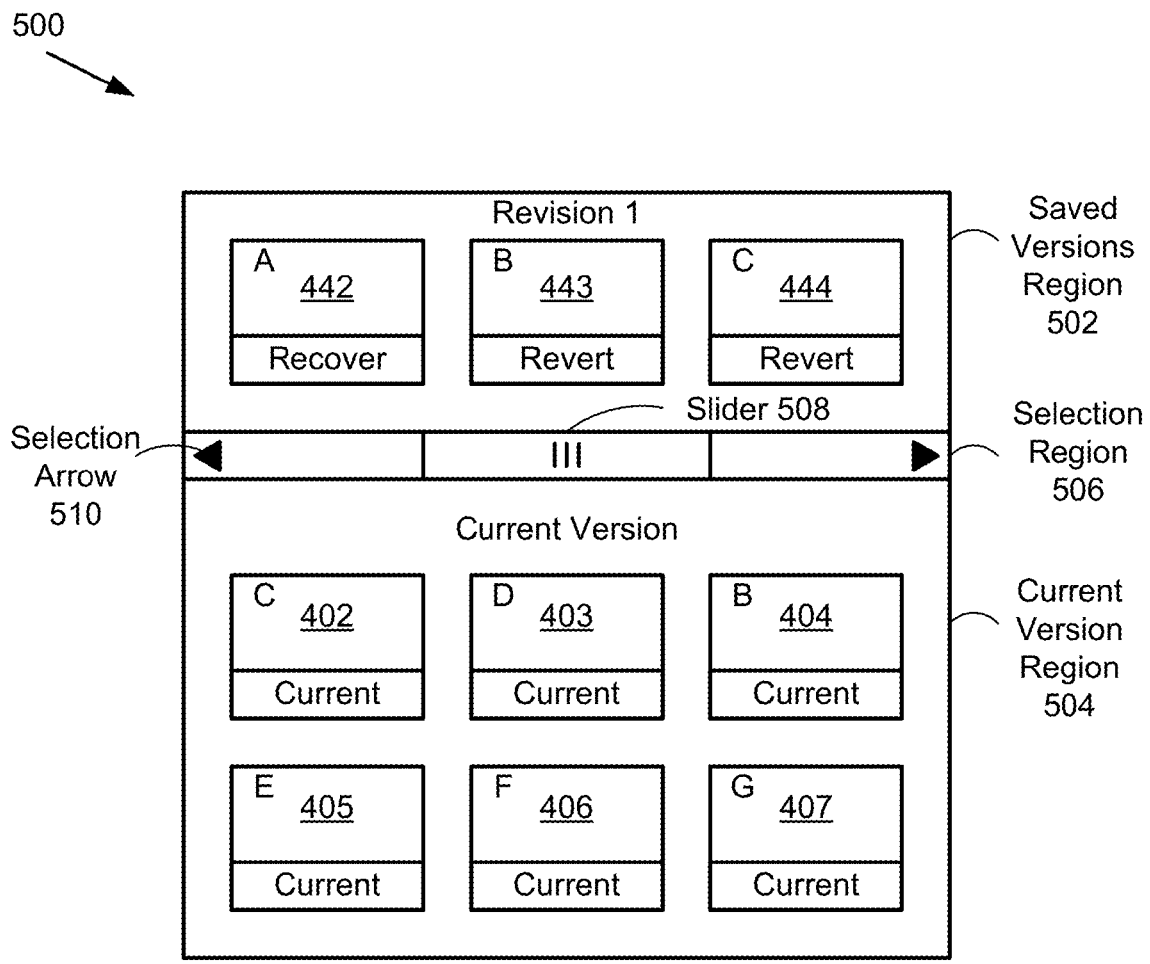
FIG. 5 illustrates one embodiment of a graphical display displaying two versions of a document.

FIG. 5 illustrates one embodiment of a graphical display 500 displaying two versions of a document. By way of example, graphical display 500 can include a current version 310 and a previous version 302 of a document and a selection region. FIG. 5 helps to illustrate one or more actions that a user can take to revert or recover one or more portions of a document. While specific graphical display elements may be discussed, other embodiments can include different display elements while still maintaining one or more concepts described herein.

Graphical display 500 can include a saved versions region 502, a current version region 504 and a selection region 506. Extending the example shown in FIG. 4, revision 5 (310) of remote document 116 can be the current version and is displayed in current version region 504. Selection region 506 can be used to select a particular previous revision. In this example, revision 1 (302) has been selected by the user and is shown in saved version region 502. In one embodiment, the user can select different revisions by moving slider 508 with a cursor within selection region 506. In another embodiment, the user can select a selection arrow 510 with a cursor to bring other revisions into saved versions region 502.

Through graphical display 500, the user can select to restore or revert one or more objects from previous saved versions and incorporate those objects into a current version. In one embodiment, thumbnail images of the objects can be shown on the graphical display 500 to assist the user in selecting the one or more objects. In one embodiment, the thumbnail images can be size reduced images of associated objects.

Graphical display 500 can be displayed though computing device 202 while documents and their related objects can be stored in the network server 112. Network 100 can advantageously allow two or more users to access a document stored in network server 112 without the need for complicated check in/check out procedures. For example, two or more computing devices can be included with network 100. Additionally, the two or more users can access the document at approximately the same time. In one embodiment, graphical display 500 can be rendered on a display with dedicated software that can run on one or more clients. In another embodiment, graphical display 500 can be displayed through a web browser.

Figure 6:
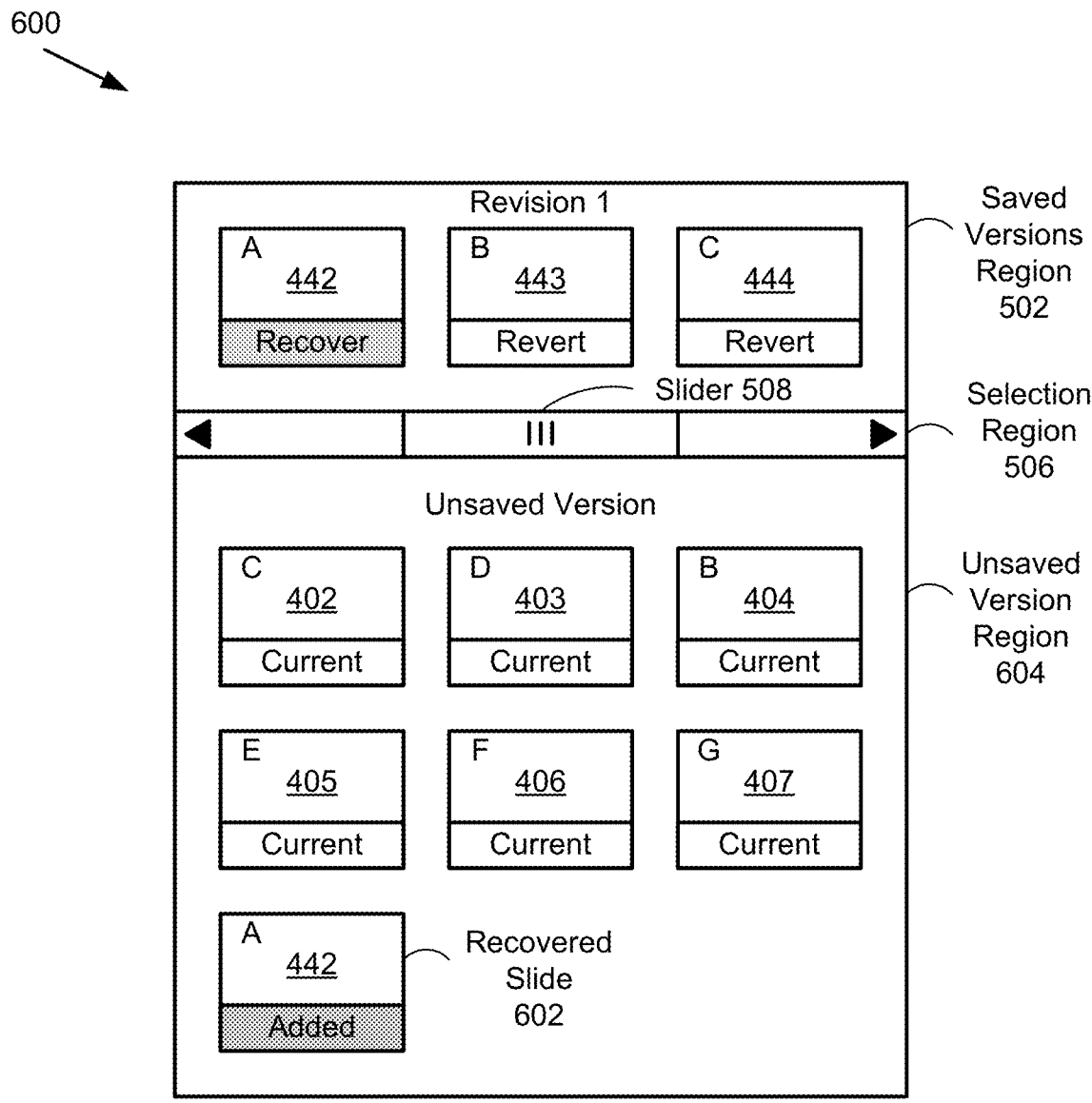
FIG. 6 illustrates a graphical display after selecting an object of a document to recover to a current version of the document.

FIG. 6 illustrates a graphical display 600 after selecting an object of a document (the object being less than an entire document, for example) to recover to a current version of the document. Thus, a current version of a document can be partially restored. The graphical display 600 can include saved versions region 502 and a selection region 506 as described in FIG. 5. Referring back to FIG. 5, if a user wanted to recover object A 442, in one embodiment the user could select object A 442 in saved versions region 502. After selecting object A 442, the selection overlay can become highlighted and indicate "recover" and object A 442 can be added to the current version of the document. This shown in FIG. 6 where the current working document is now displayed in unsaved version region 604. Object A 442, which can be shown as a thumbnail in unsaved version region 604, can include a selection overlay of "added" to indicate the status of the object with respect to the current version of the document.

Figure 7:
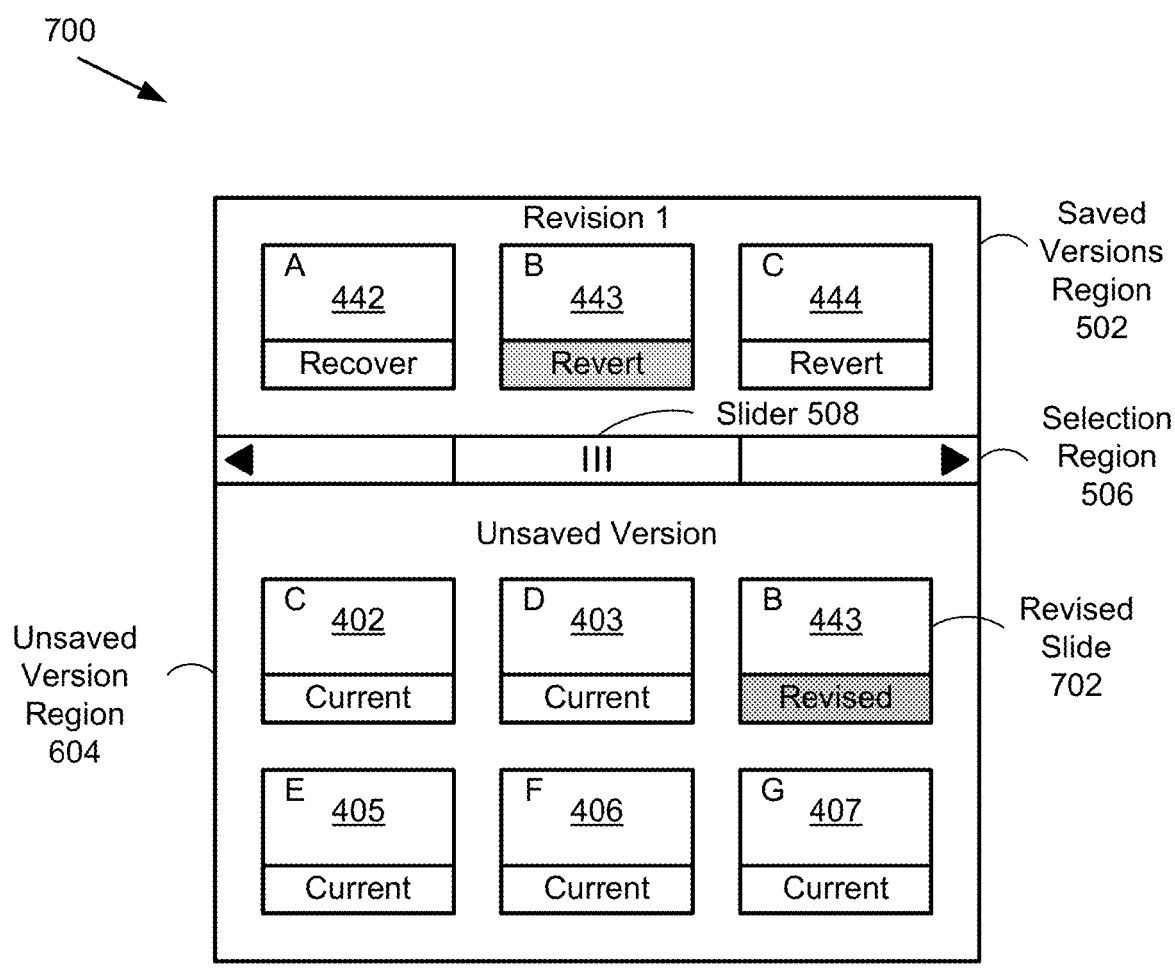
FIG. 7 illustrates the graphical display after selecting to revert a portion of the document to a previous version.

FIG. 7 illustrates graphical display 700 after selecting to revert a portion of the document to a previous version. Display 700 can include three regions as before: saved versions region 502, selection region 506 and unsaved version region 604. In this example, the user can choose to replace a newer version of object B 404 with an older version of object B 443. The selection overlay for object B 443 can become highlighted and can show "revert" (in saved version region 502) indicating that the user can revert object B 443 to an earlier version. In one embodiment the user can select object B 443 in the saved versions region 502 and can drag it to unsaved version region 604. When object B 443 appears in unsaved version region 604, the related thumbnail can change to show object B 443 in unsaved version region 604 with a selection overlay changed to revised.

Figure 8:
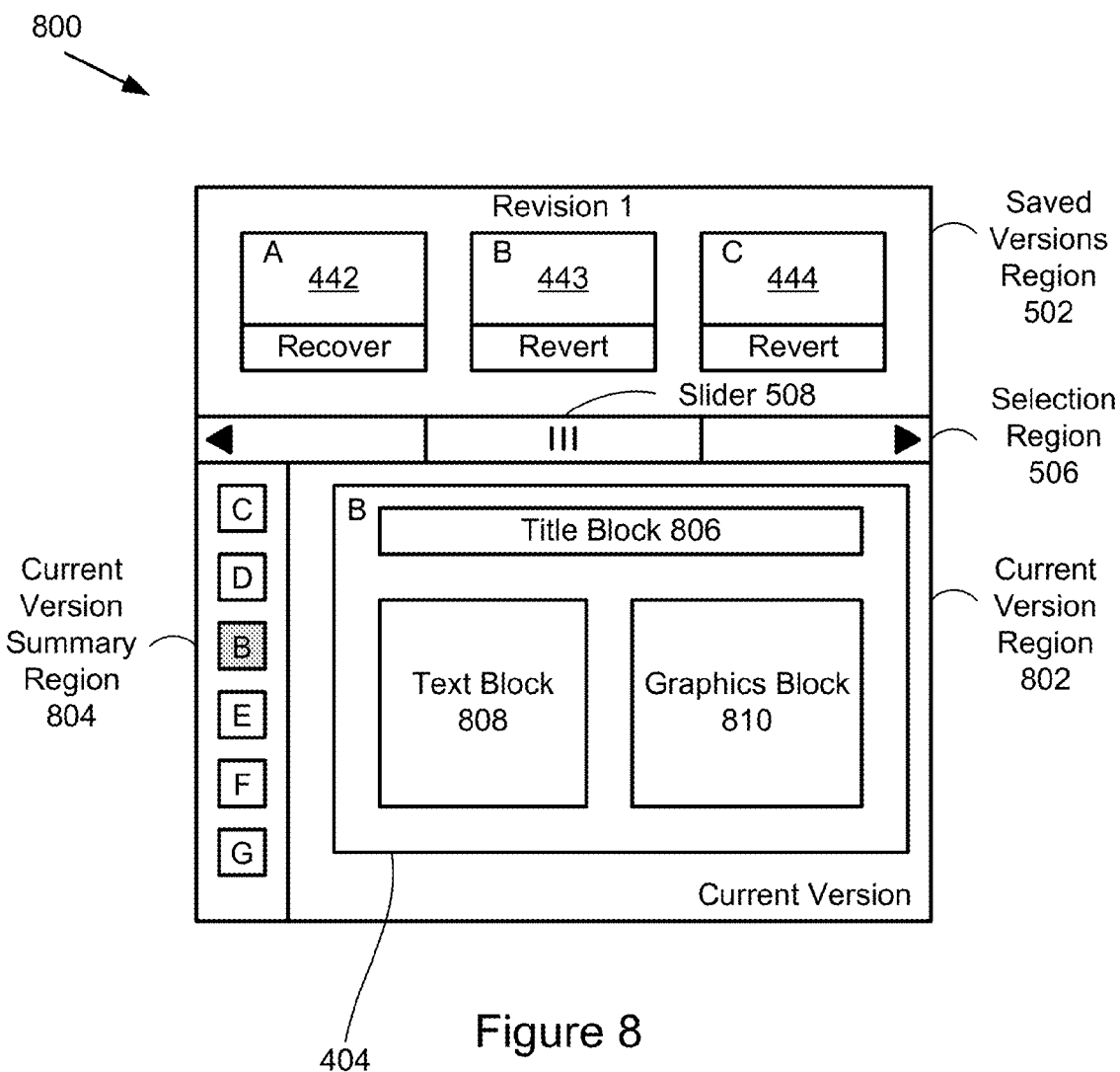
FIG. 8 illustrates another embodiment of a graphical display for managing partial document restoration.

FIG. 8 illustrates another embodiment of a graphical display 800 for managing partial document restoration. In some cases, a thumbnail image may be sufficient for a user to determine which portions (i.e., objects) of a document to recover or revert; however, at other times more detail may be desired. Graphical display 800 illustrates one approach that can provide more detailed information to the user. As described above in FIGS. 6 and 7, graphical display 800 can include saved versions region 502 and selection region 506. In one embodiment, there can be two regions for displaying current version information. A first region can be current version summary region 804 and a second region can be current version region 802. Current version summary region 804 can include images, scaled images, thumbnails or icons that represent each object within a document. Current version region 802 can display detailed information related to a selected object in current version summary region 804. Returning to our example of FIG. 7, current document is revision 5 302, thus the six objects that make up the current version of the document can be shown in current version summary region 804. The user can select a particular object from the current document (in this case, slide B 404 can be selected in current version summary region 804). In response to this selection, slide B 404 can be shown in current slide region 802. Graphical display 800 can advantageously show details included in the selected object. In this example, slide B 404 can be selected and objects included in slide B 404 such as title block 806, text block 808 and graphics block 810 can be shown.

The user can select older versions of the current document with slider 508 and the portions of the revisions (objects) that can be reverted or recovered can appear in saved versions region 502. This action is described in conjunction with FIG. 9 below.

Figure 9:
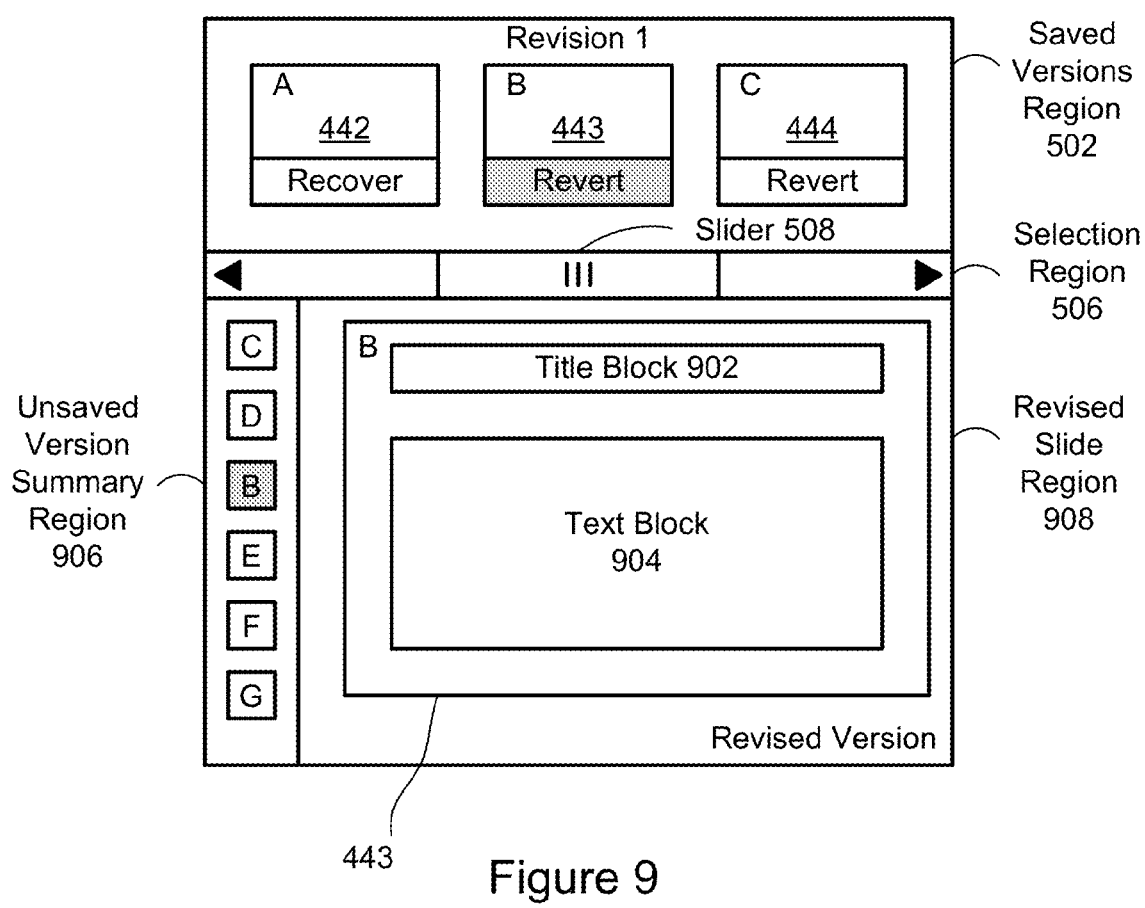
FIG. 9 illustrates yet another embodiment of a graphical display for managing partial document restoration.

FIG. 9 illustrates yet another embodiment of a graphical display 900 for managing partial document restoration. Graphical display 900 can include saved versions region 502, selection region 506 and revised slide region 908. In one embodiment, the user can select different revisions of the current document with slider 508 in the selection region 506. Continuing the example started in FIG. 8, the user can select slide B 443 from Revision 1 (302) shown in the saved version region 502. The selection overlay portion of slide B 443 can indicate "revert" meaning that slide B 443 can replace slide B 404 in the current document. In this example, slide B 443 is now shown in revised slide region 908 and the symbol (icon) for slide B can be highlighted in unsaved version summary region 906.

In one embodiment, regions of some graphical displays can be context sensitive. For example, the user can view graphical display 800 and review older revisions of a current document. However, as soon as the user selects at least one object from the older revision from saved versions region 502, then current slide region 802 can transition to revised slide region 908, showing the incorporation of a selected object from an older revision, into the current revision.

Figure 10:
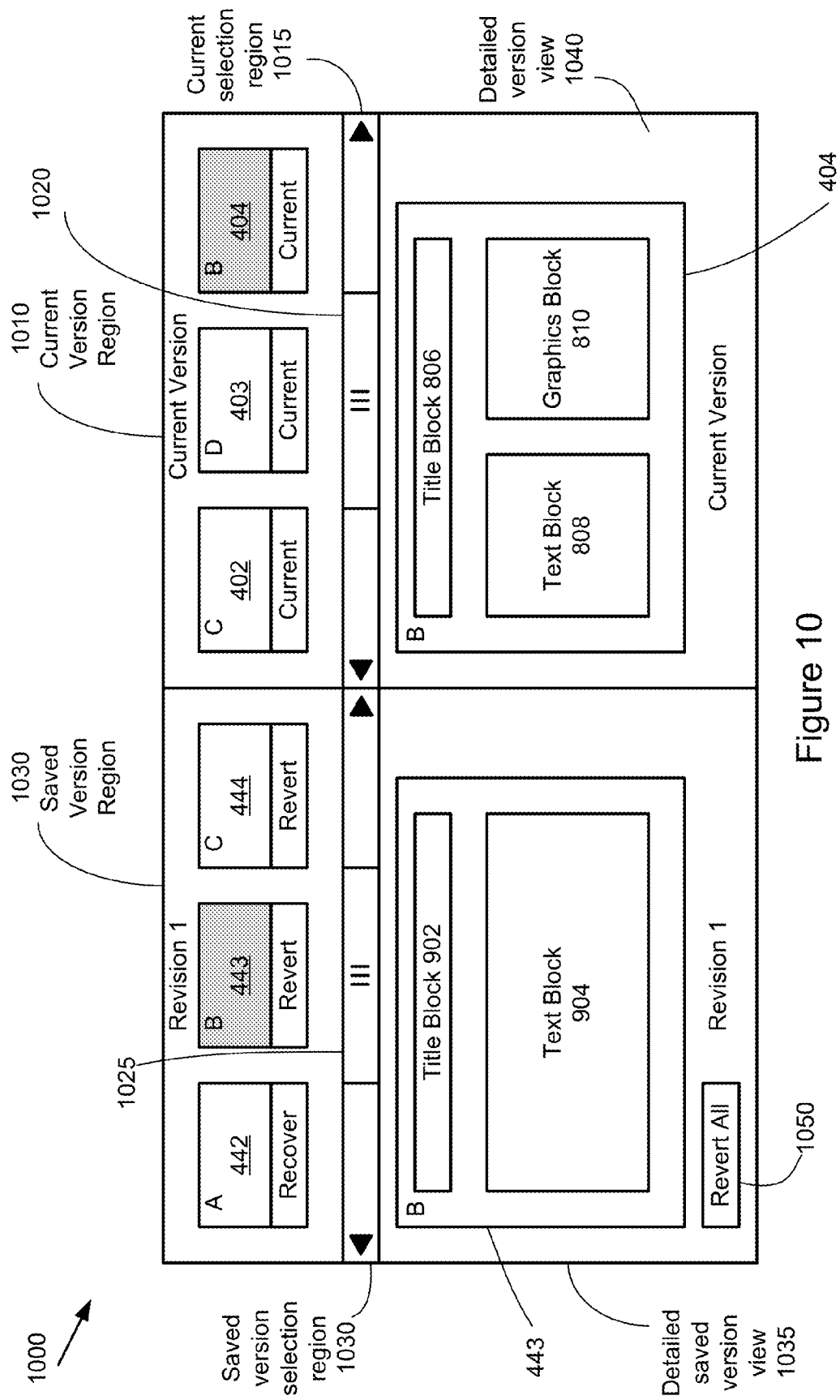
FIG. 10 illustrates a graphical display 1000 enabling a side-by-side comparison of different revisions of a document

While a document can include one or more objects, the objects can be independent from each other and the granularity of the objects do not necessarily have to be at a page level as discussed thus far. Rather, objects can be smaller and more finely grained than a page. FIG. 10 illustrates a graphical display 1000 enabling a side-by-side comparison of different revisions of a document. In one embodiment, the right portion of graphical display 1000 can show a current version of the document and the left portion of graphical display 1000 can show a selected previous version. Current version region 1010 can display one or more objects included in the current version (in this example, Revision 5 (310)). Slider 1020 in current selection region 1015 can allow the user to scroll through the different slides included in the current version. As the user selects an object (in this case slide B 404) in current version region 1010, a more detailed view of the selected object is shown in detailed current version view 1040.

Similarly, the user can scroll through objects included in a saved revision with slider 1025 in saved version selection region 1030. Slider 1025 can affect the display of objects from an older version in saved version region 1030. If the user selects an object, a detailed view of the object can appear in detailed saved version region 1035. In this example, the user has selected slide B 443 in saved version region 1030 and a detailed view of slide B 443 is shown in detailed saved version selection region 1035. Note that the selection overlay can indicate a possible partial restoration action. For example, the selection overlay for object B 443 can indicate "revert indicating a possible action and illustrating a relationship between object B 443 and the current document version. Included in graphical display 1000 is a revert all action key 1050. The revert all action key 1050 can be used to revert all objects shown in detail saved version region 1035.

Figure 11:
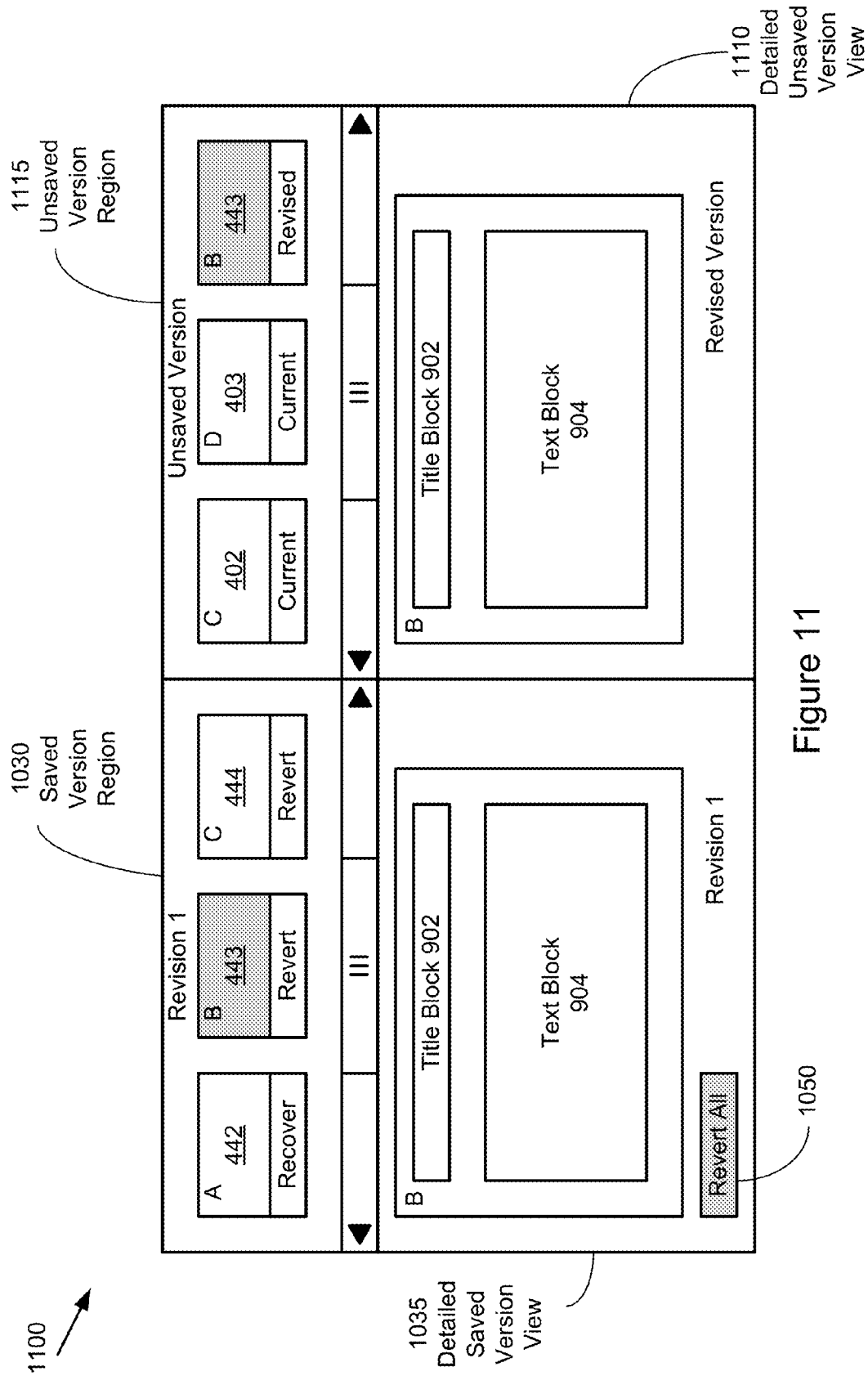
FIG. 11 illustrates a graphical display reflecting a current state of documents, after a revert all action has been selected.

FIG. 11 illustrates a graphical display 1100 reflecting a current state of documents, after a revert all action has been selected. FIG. 11 continues the example began in FIG. 10 above. Graphical display 1100 can again display two versions side by side. On the left side, an older version of the selected document can be shown. In saved version region 1030 one or more objects from a document included in a previous version or revision can be displayed. In this example, Slide B 443 of previous revision 1 (302) has been selected and is shown in detailed saved version view 1035. As revert all 1050 is selected, all objects currently in the detailed saved version view 1035 can be selected and used to revert the corresponding objects in the current version.

On the right side of graphical display 1100, in detailed unsaved version view 1110 objects in a current version of a document are displayed. Since revert all 1050 was selected, the current document can be modified to include all objects shown in detailed saved version view 1035. In this example, slide B 443 can replace slide B 404 in the current version. As shown in detailed unsaved version view 1110, slide B 443 includes title block 902 and text block 904, matching the objects shown in detailed saved version view 1035. Unsaved version region 1115 can be updated to reflect the revised slide B 443; in particular the selection overlay associated with slide B 443 can be changed to "revised" to reflect the operation.

Figure 12:
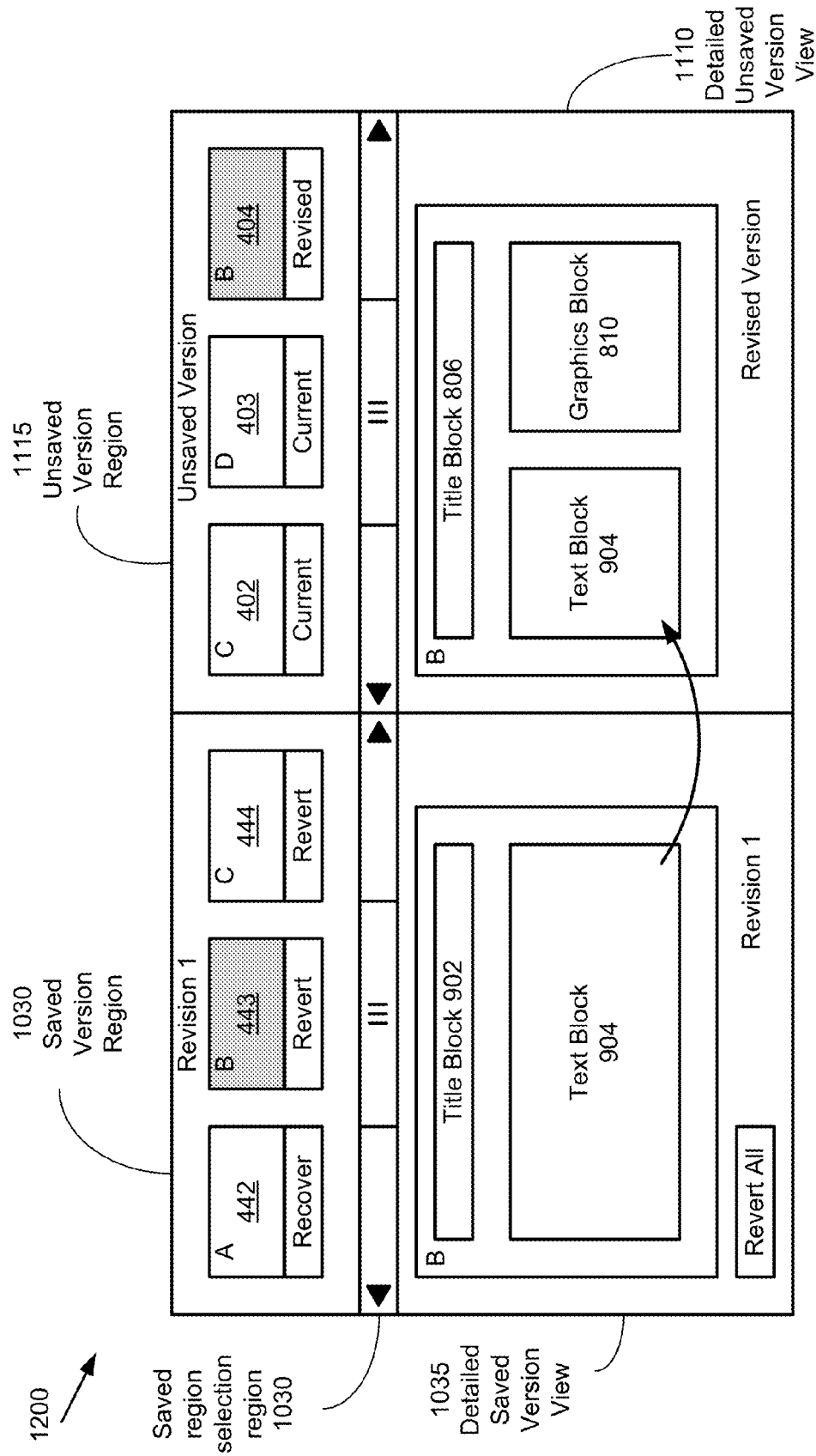
FIG. 12 is a graphical display that illustrates reversion of at least one object to a current document.

Individual objects can be selected and restored or reverted in accordance with one embodiment of the specification. In one embodiment, such a restoration or reversion action can be directed by a user through a graphical interface. FIG. 12 is a graphical display 1200 that illustrates reversion of at least one object to a current document.

Graphical display 1200 can include saved version region 1030 and unsaved version region 1115. In this example, revision 1 of a saved document is shown, and in particular slide A 442, slide B 443 and slide C 444 are displayed in saved version region 1030. Other slides can be displayed by selecting and moving a slider in saved version selection region 1030. Slide B 443 can be selected, as shown by grayed region in the thumbnail of slide 443 in saved version region 1030. In detailed saved version view 1035, the user can select one or more objects to include in a current slide. By way of example, slide B 443 is shown to include title block 902 and text block 904. Either one or both of these objects can be selected for inclusion in a current document.

Graphical display 1200 can also include detailed unsaved version view 1110. In this view, a current version of one or more objects within a document can be shown. Continuing the example, text block 904 shown in detailed saved version view 1035 can be selected for inclusion into a page shown in detailed unsaved version view 1110. In one embodiment, a selected object can be "dragged" from the saved version detailed view 1035 window to the unsaved version detailed view 1110 window. The user can advantageously drill down into objects included in a revision and selectively restore one or more objects. Hierarchical relationships of objects to other objects can be presented to the user.

Figure 13:
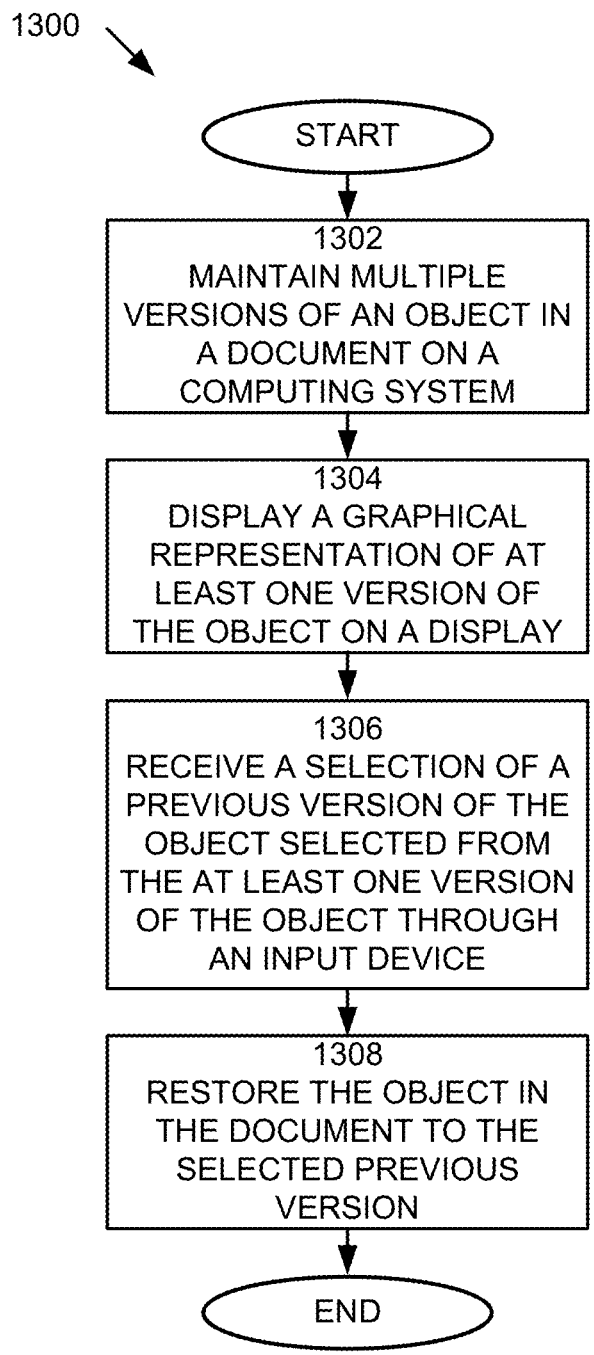
FIG. 13 is a flow chart of method steps for restoring at least one object in a document in accordance with one embodiment of the specification.

FIG. 13 is a flow chart 1300 of method steps for restoring at least one object in a document in accordance with one embodiment of the specification. Persons skilled in the art will understand that any system configured to perform the method steps in any order is within the scope of this description. The method is described from the point of view of a computing device, but can be provided by any feasible apparatus. The method begins with step 1302 when multiple versions of an object included in a document are maintained on a computing system. The objects and documents can be stored on a local computer or can be stored on a remote computer such as a network server. For example, computing device 202 can access a remote document 116 stored in a network server 112 through a network 100. In step 1304, a graphical representation of at least one object can be displayed. In another embodiment, two or more graphical representations can be displayed, as may be the case when the user is desirous to revert one version of an object with a different revision of the object. For example, the displayed objects can be thumbnail representations of a current version of an object and a previous version of an object. In step 1306, the computing device 202 can receive a selection of a previous version of an object selected format least one version of the object previously displayed. In step 1308, the selected object can be included in a current working version of the document and the method can end.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for managing a plurality of versions of a document, the method comprising:
by a computing system:
causing a graphical representation of a previous version of the document and one or more objects of the previous version of the document to be displayed within a user interface (UI) of the computing system, wherein each object of the one or more objects represents a portion of the previous version of the document, and each object includes an action indicator in an object region of the UI that characterizes a manner in which the object is configured to be implemented in a revised version of the document;
receiving a selection of a particular object among the one or more objects; and
in response to receiving the selection:
generating the revised version of the document that includes the particular object implemented according to the action indicator associated with the particular object; and
displaying the revised version of the document.

2. The method as recited in claim 1, further comprising: displaying graphical representations of the particular object associated with the revised version of the document.

3. The method as recited in claim 1, wherein the revised version is displayed in a region of the UI distinct from the previous version.

4. The method as recited in claim 1, wherein the action indicator included in each respective object of the one or more objects characterizes that the respective object is configured to be recovered or reverted in the revised version.

5. The method as recited in claim 1, further comprising:
in response to receiving the selection:
modifying the action indicator of the particular object.

6. The method as recited in claim 1, wherein the revised version of the document is displayed in an unsaved version region of the UI.

7. The method as recited in claim 1, further comprising:
saving the revised version of the document; and
generating a preview of the particular object associated with the revised version.

8. A system for managing multiple versions of a document, the system comprising:
a processor; and
a memory containing instructions that, when executed by the processor, cause the system to perform:
displaying a first revised version of the document having one or more document objects in a user interface (UI) of the system, wherein each document object of the one or more document objects represents a portion of the first revised version of the document, and each document object includes an action indicator in an object region of the UI that characterizes a manner in which the document object is configured to be implemented in a second revised version of the document;
receiving a selection of a particular document object among the one or more document objects; and
generating the second revised version of the document by reverting or recovering the particular document object of the first revised version of the document in accordance with the action indicator of the particular document object.

9. The system as recited in claim 8, wherein the system further performs:
modifying the action indicator of the particular document object in response to receiving the selection.

10. The system as recited in claim 8, wherein the first revised version and the second revised version are concurrently displayed in separate regions of the UI.

11. The system as recited in claim 8, wherein the action indicator included in each respective document object of the one or more document objects characterizes that the respective document object is configured to be recovered or reverted.

12. The system as recited in claim 8, wherein each document object of the one or more document objects is a page, a slide, or a portion of text.

13. The system as recited in claim 8, wherein the particular document object is displayed as a thumbnail in the UI.

14. The system as recited in claim 8, wherein the system further performs:
displaying a recovery action in the action indicator of each document object of the one or more document objects when the document object is not included in the first revised version of the document.

15. A non-transitory computer readable medium configured to store instructions that when executed by a processor of a computing device cause the computing device to perform:
displaying a previous version of a document and one or more document objects associated with the previous version of the document in a user interface (UI) of the computing device, wherein each document object of the one or more document objects represents a portion of the previous version of the document, and each document object includes an action indicator in an object region of the UI that characterizes a manner in which each document object of the one or more document objects is configured to be implemented in a revised version of the document;
receiving a selection of a particular document object among the one or more document objects; and
generating the revised version of the document that includes the particular document object implemented according to the action indicator associated with the particular document object.

16. The non-transitory computer readable medium as recited in claim 15, wherein the computing device further performs:
modifying the action indicator of the particular document object upon receiving the selection.

17. The non-transitory computer readable medium as recited in claim 15, wherein the revised version of the document is displayed in an unsaved version region of the UI.

18. The non-transitory computer readable medium as recited in claim 15, wherein the revised version of the document includes one or more additional document objects that are different from the one or more document objects associated with the previous version of the document.

19. The non-transitory computer readable medium as recited in claim 15, wherein the object region is in a region of the UI distinct from the previous version of the document and the revised version of the document.

20. The non-transitory computer readable medium as recited in claim 15, wherein the particular document object includes an image, text, a page, or a slide.

* * * * *